United States Patent [19]

Glennie

[11] 4,091,553
[45] May 30, 1978

[54] EMERGENCY DISPLAY APPARATUS AND METHODS OF CONSTRUCTING AND UTILIZING SAME

[76] Inventor: Shirley Lorraine Glennie, 1552 Odette Dr., Hartland, Mich. 48029

[21] Appl. No.: 739,984

[22] Filed: Nov. 8, 1976

[51] Int. Cl.² .......................... B60Q 7/00; G09F 7/00
[52] U.S. Cl. ........................................ 40/591; 40/617; 116/173
[58] Field of Search ................ 40/129 C, 128, 125 G, 40/317, 311, 309, 82, 83; 116/173, 174, 28 R, 42

[56] References Cited

U.S. PATENT DOCUMENTS

| 2,080,564 | 5/1937 | Falkenstein | 40/309 |
| 2,452,842 | 11/1948 | Davis | 116/173 |
| 2,933,841 | 4/1960 | Lawlor | 40/129 C |
| 3,091,215 | 5/1963 | Kenmore | 116/173 |
| 3,703,152 | 11/1972 | Morton | 40/129 C X |
| 3,738,039 | 6/1973 | DeFuria | 40/129 C |
| 3,975,849 | 8/1976 | Tuleja | 40/129 C X |
| 4,002,138 | 1/1977 | Dobala | 116/173 X |
| 4,015,557 | 4/1977 | Schulein | 40/129 C |

*Primary Examiner*—John F. Pitrelli

[57] ABSTRACT

A display apparatus for use by stranded motorists in an automotive vehicle which employs pictorial representations to convey to passing motorists the nature of an emergency distress condition. The apparatus includes a plurality of sign members having pictorial representations displayed thereon which correspond to distress conditions such as medical problems, fuel problems and need for a tow truck, which are often encountered by motorists. The sign members are selectively made conspicuous to attract attention from passing motorists when the emergency distress situation arises.

1 Claim, 6 Drawing Figures

EMERGENCY DISPLAY APPARATUS AND METHODS OF CONSTRUCTING AND UTILIZING SAME

BACKGROUND OF THE INVENTION

1. Field of the Invention

The present invention relates to an emergency display apparatus which employs pictorial representations to convey to passing motorists the nature of an emergency distress condition being experienced by a stranded motorist in an automotive vehicle.

More particularly, the invention relates to the use of sign members which are conspicuously displayed with respect to the stranded automotive vehicle to facilitate visibility and comprehension thereof by passing motorists.

2. Description of the Prior Art

One of the major problems encountered in the widespread use of automotive vehicles is a stranded motorist situation in which the stranded motorist is in need of help and has difficulty in conveying this need to passing motorists. In such instances, the stranded motorist is faced with a number of safety hazards in having to leave the safety of the stranded vehicle to attempt to flag down help from a passing motorist. The stranded motorist not only runs the risk of being run down from a passing vehicle, but also the risk of being approached by an unscrupulous person.

In order to avoid the problems encountered by the stranded motorist, there has long been sought a device for attracting the attention of a passing motorist and alerting him as to the nature of the distress condition being experienced by the motorist in the stranded vehicle so that proper help can be sought.

Various prior art attempts have been made to this end, however, none have been successful in accomplishing the aforementioned desired goals of such a device. Illustrative of such prior art attempts are: U.S. Pat. No. 3,024,552 issued in 1962 to W. B. MacLea entitled "EMERGENCY SIGNS FOR AUTOMOBILES;" U.S. Pat. No. 3,703,152 issued in 1972 to Morton entitled "DISTRESS SIGNALING DEVICE;" U.S. Pat. No. 3,738,039 issued in 1973 to DeFuria entitled "HIGHWAY SAFETY AID;" U.S. Pat. No. 3,797,151 issued in 1974 to Dexter entitled "STRANDED MOTORISTS' SIGN;" U.S. Pat. No. 3,903,629 issued in 1975 to Gruna entitled "EMERGENCY SIGN FOR AUTOMOTIVE VEHICLES;" and U.S. Pat. No. 3,936,967 issued in 1976 to Davis entitled "EMERGENCY SIGN DEVICE."

All of the above mentioned prior art devices have failed to overcome the aforementioned problems encountered by a stranded motorist by merely providing devices which simply attract the attention of passing motorists, without specifically alerting them as to the nature of the distress condition being experienced by the stranded motorist in a manner which is readily comprehended by the passing motorist without the need of stopping or drastically reducing speed of his vehicle.

The present invention eliminates all the shortcomings and disadvantages attendant the prior art devices by providing an apparatus for effectively alerting passing motorists as to the nature of a distress condition being experienced by a stranded motorist. In this manner, aid is more readily attainable by the stranded motorist since there is no need for a passing motorist to directly contact the stranded motorist, which most passing motorists are reluctant to do anyway, and thus reduce danger, inconvenience, and time delays which might otherwise be encountered by the motorists. The passing motorist can, for example, drive immediately to a telephone to alert the proper authority, such as a policeman, as to the nature of the distress condition being experienced by the stranded motorist, without actually having a stop to directly contact the stranded motorist for an explanation as to the distress condition.

Thus, the present invention successfully solves the problems mentioned hereinabove and at the same time provides an apparatus which requires a minimum of parts and is inexpensive to manufacture.

SUMMARY OF THE INVENTION

The present invention provides an emergency sign display apparatus for automotive vehicles which includes at least one emergency display sign with each of the signs having prominently displayed thereon a pictorial representation of a particular motorist emergency distress condition being experienced by a stranded motorist. The apparatus further includes means for storing the signs during non-distress motorist driving conditions as well as means for selectively displaying the signs in a conspicuous manner on the automotive vehicle so as to alert passing motorists as to the nature of the particular motorist emergency distress condition being experienced.

It is an object of the invention to provide such a display apparatus utilizing pictorial representations to identify particular motorist distress conditions wherein the display sign is fabricated of a sheet of flexible rollable material which can be rolled up to be stored in an elongated container. Each of the signs may depend from an elongated rigid arm member which in turn selectively engages the upper edge of a vertically adjustable window of an automotive vehicle to permit the arm member having the display sign depending therefrom to extend substantially horizontally outwardly from the window for easy detection by a passing motorist. Preferably, the pictorial representation on each sign is prominently displayed on each opposing face of the sign.

Yet another object of the invention is to provide a display apparatus utilizing pictorial representations to identify particular motorist distress conditions wherein each display sign is fabricated from translucent material and is secured to a highly visible portion of an automotive vehicle. At least one light is provided between the automotive vehicle portion and the display sign to conspicuously display the sign to passing motorists when the lights are in operation. Preferably, the lights are operated by suitable switch means provided within the automotive vehicle for selectively operating the desired lights.

Other objects and details of the invention will become apparent from the following description, when read in conjunction with the accompanying drawings.

DETAILED DESCRIPTION OF PREFERRED EMBODIMENTS

Figure 1:
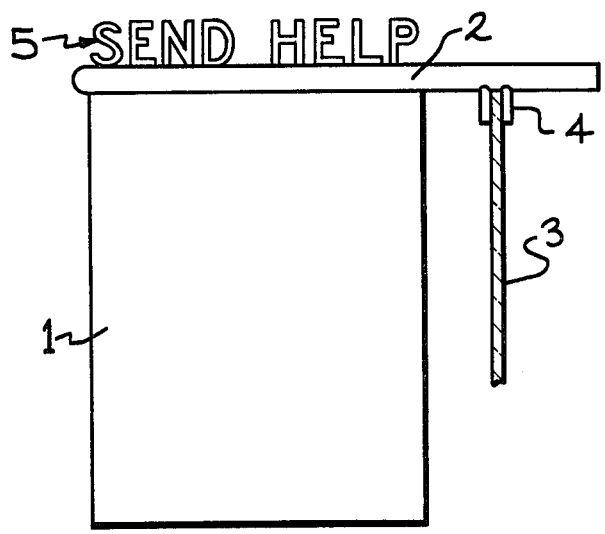
FIG. 1 illustrates an elevational view of the emergency display apparatus in a first operable embodiment.

With reference to FIG. 1, there is depicted a first preferred embodiment of the invention in its operable position. The display sign 1 has its top edge secured or forming a unitary one-piece structure with to a rigid arm member 2, and depends downwardly therefrom as depicted. The display sign 1 is preferably fabricated of a flexible cloth-like material such as plastic, vinyl, canvas, or cloth, and, if necessary, is secured to the rigid arm member 2 by any suitable fastener, such as staples (not shown). A more fully descriptive explanation of the display sign 1 will be set forth hereinbelow with respect to FIGS. 2-4. It is desirable that the display sign 1 have a weight member (not shown) affixed to the bottom thereof.

As depicted, the rigid arm member 2, which may be constructed of plastic, wood, or any other desirable rigid material, is secured to a window portion 3 of an automotive vehicle. The rigid arm member 2 may be approximately ½ inch in diameter, and includes an extended groove portion 4 which corresponds in width to the window portion 3. The groove member 4 is desirably placed approximately 2 inches from the end of the rigid arm member 2. The window portion 3 of FIG. 1 depicts a cross sectional view of a conventional vertically adjustable side window portion found on most automotive vehicles. The rigid arm member 2 is further provided with a distress notice, which in this case comprises the words "SEND HELP," on the upper edge thereof. The letters used to form the notice are preferably fabricated of a reflective material, such as reflective plastic.

It should be noted that the upper edge of the arm member 2 will abut against the window receiving frame portion of the automotive vehicle when the vertically adjustable window 3 is adjusted to be substantially closed. In this manner, the arm member 2 will extend substantially horizontally outwardly from the automotive vehicle in clear visibility to passing motorists. The extended groove portion 4 corresponds very closely in its width dimension to the width of the window portion 3, however, and thus the arm member 2 can be caused to extend horizontally outwardly from the automotive vehicle even when the window 3 is not in a substantially closed position. In order to afford maximum safety to the distressed stranded motorist, however, it is desirable that the window portion 3 be in a substantially closed position, and due to the minimal ½ inch diameter of the arm member 2, the window portion 3 can be closed to within ½ inch of its fully closed position, thus preventing entry to the car by any undesired or unscrupulous individuals.

Figure 5:
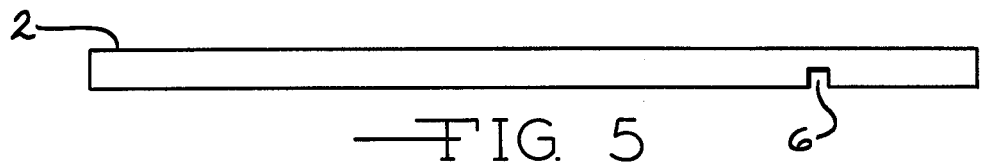
FIG. 5 depicts an elevational view of the rigid arm member having the display sign detached therefrom.

In this connection, attention is drawn to FIG. 5, which depicts a somewhat modified embodiment of the rigid arm member 2. In this embodiment, the extended groove portion 4 has been replaced by a groove portion 6. The groove portion 6 extends inwardly into the arm member 2 to a depth of approximately ¼ inch, or half of the ½ inch diameter of the arm member 2. In this manner, it can be seen that if the arm member 2 as depicted in FIG. 5 were placed on the window portion 3 of FIG. 1, it would be possible to close the window portion 3 an additional ¼ inch, or within ¼ inch of the window receiving frame portion of the automotive vehicle, thus providing increased safety to the stranded motorist.

Figure 2:
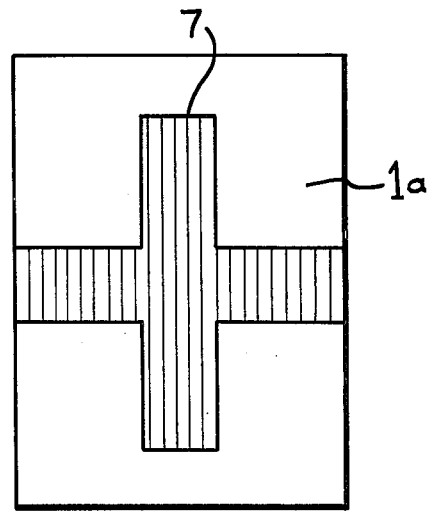
FIG. 2 depicts a display sign of the apparatus indicating a medical distress condition.
Figure 3:
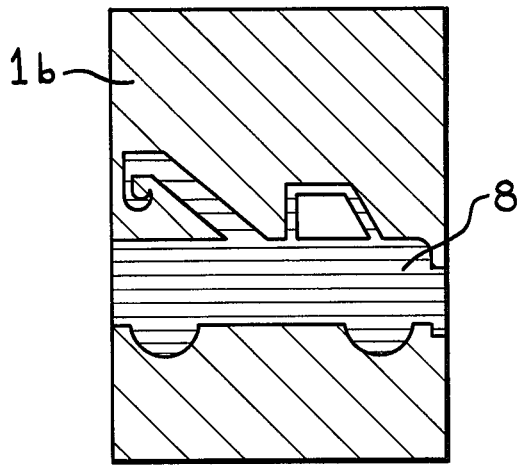
FIG. 3 shows a display sign of the apparatus indicating a need-for-tow-truck distress condition.
Figure 4:
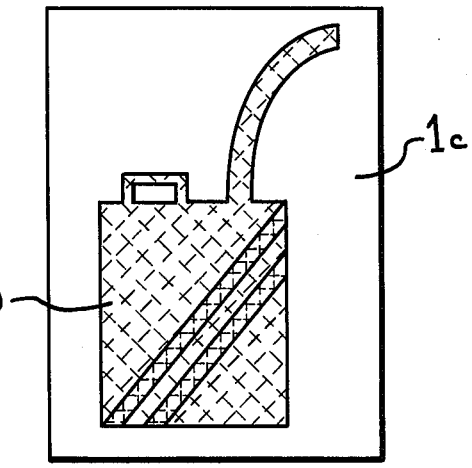
FIG. 4 illustrates a display sign of the apparatus indicating an out-of-gasoline distress condition.

Referring now to FIGS. 2-4, various pictorial representations which may be displayed on the sign 1 are illustrated. It should be noted that regardless of the particular pictorial representation displayed, the sign 1 and its corresponding picture is fabricated of a highly iridescent or highly reflective material which would be conspicuously visible, even in a night-time situation, to passing motorists.

With reference to FIG. 2, there is depicted an emergency display sign 1a having a conventional "red cross" symbol 7 depicted thereon. The pictorial representation comprises the red cross 7 set forth on the white background of the sign 1a. This particular pictorial representation would be used by a stranded motorist to indicate to passing motorists that he is experiencing an emergency medical situation. Because the "red cross" symbol is widely known, there would be little doubt in a passing motorist's mind that the display sign was intended to indicate a medical emergency distress situation.

Referring to FIG. 3, there is depicted an emergency display sign 1b having a yellow-green background with a blue tow truck 8 pictorial representation depicted thereon. The green and blue colors used in the sign would be sharply contrasted and highly reflective for maximum visibility, and would alert passing motorists to a "need-for-tow-truck" distress situation of a stranded motorist. Hereagain, the two truck is clearly depicted and there would be little doubt as to the nature of the distress condition being experienced, and the type of assistance required, by the stranded motorist.

With reference now to FIG. 4, there is illustrated a display sign 1c, which preferably has an orange background, with a black gasoline can 9 depicted thereon. The sign 1c would be used by a stranded motorist to indicate to passing motorists an "out-of-gasoline" distress condition, and hereagain there would be little doubt in the passing motorist's mind as to the nature of the emergency and the type of assistance required.

It should be noted that the display signs 1a, 1b and 1c are merely representative of the type of pictorial representations which would be most useful in common stranded motorist distress conditions. Each of the signs 1a, 1b and 1c would desirably have a dimension at least as large as 9 inches by 12 inches in order to assure maximum visibility thereof. Each of the pictorial representations is preferably depicted boldly on both opposing faces of the display signs 1a, 1b, and 1c, and can be displayed on the signs either by painting, press-bonding, inlaying, or by any other suitable means. Again, each pictorial representation is sharply contrasted in color with the background of the display sign upon which it is displayed, and is highly reflective, in order to provide maximum conspicuous visibility thereof to passing motorists.

Because the display signs 1a, 1b and 1c are desirably flexible, they can be easily rolled around the arm member 2 for convenient storage purposes. It should be noted that the display sign 1 can be detachably secured to the arm member 2 for selective removable therefrom, thus enabling each of the signs 1a-1c to be selectively secured to a common arm member 2, thus further increasing convenient storage of the apparatus. A separate elongated container, of any desired configuration, (not shown) is preferably provided for storage of the various components of the apparatus therein. Additionally, it is contemplated that the arm member 2 of each display sign 1a-1c have a color coded end portion which corresponds either to the colors of the pictorial representation contained on that particular display signa or a symbol similar to the representation itself, thus enabling the stranded motorist to easily identify each of the signs even in its rolled up condition around arm member 2.

In operation, the stranded motorist has merely to select the desired display sign, unroll the sign from the arm member 2, slightly roll down a desired window which preferably faces approaching traffic, insert the groove portion 4 or 5 on the upper edge of the window portion 3, roll the window back up to a near-closed position, and wait for help, without ever having to leave the safe confines of his automotive vehicle. The display sign (1a-1c) will be conspicuously visible to passing motorists, will be held taut by the aforementioned bottom weight, and will readily alert the passing motorists to the nature of the distress condition of the stranded motorist, and the type of assistance required.

Figure 6:
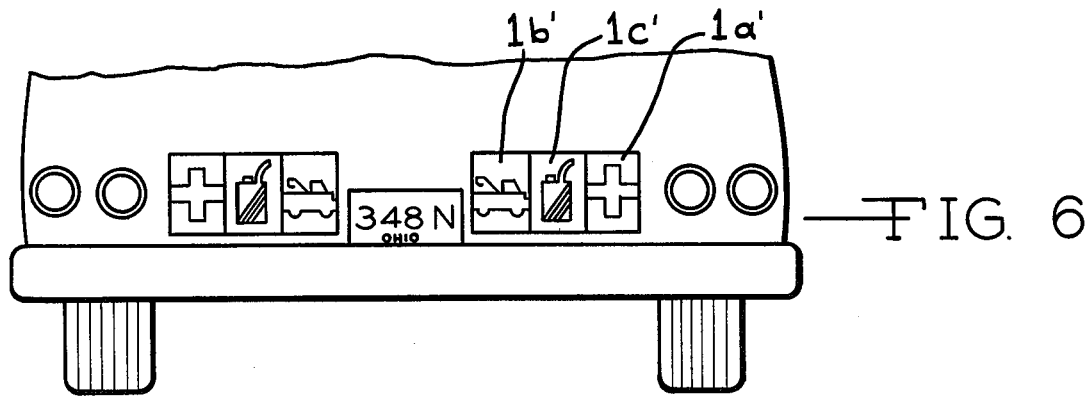
FIG. 6 illustrates an elevational view of the emergency display apparatus in a second operable embodiment.

With reference to FIG. 6, there is depicted a second embodiment of the emergency display apparatus in accordance with the present invention. In this embodiment, the display signs are fabricated of rigid translucent material, such as tail light lens material, and are secured to the rear portion of an automotive vehicle as depicted. The display signs 1a', 1b', and 1c', correspond with respect to the pictorial representations displayed thereon to the aforedescribed display signs 1a, 1b, and 1c, respectively. Lights, such as would be comparable to a conventional automobile tail light or flashing emergency light, are disposed between the automotive vehicle body and the display signs 1a', 1b', and 1c', to selectively light up the respective signs in order to make them conspicuously visible to passing motorists. In this connection, suitable light switches (not shown), which may be either color coded or picture coded with the display signs 1a', 1b', and 1c' to easily identify same, are provided on the interior of the automotive vehicle for activation by the stranded motorist without having to leave the safety and comfort of the automotive vehicle. It should be noted that although FIG. 6 depicts two sets of the display signs 1a', 1b', and 1c', disposed symmetric with respect to the licence plate of the vehicle, the disposition of the signs with respect to the automotive vehicle is not restricted to this particular configuration. Alternatively, it is contemplated that the display signs 1a', 1b', and 1c' with their respective lights, can be disposed on the top or roof portion of the automotive vehicle, or in any suitable location with respect to the automotive vehicle body which would provide maximum visibility to passing motorists.

The present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. An emergency sign display kit for motor vehicles comprising:
   three emergency display signs, each said sign having prominently displayed thereon a different pictorial representation of a particular motorist emergency distress condition; said pictorial representations comprise a representation indicating a medical distress condition comprising a red cross on a white background, a representation indicating an out-of-fuel distress condition comprising a black gas can on an orange background and a representation indicating a need for a tow-truck distress condition comprising a blue tow-truck on a yellow-green background;
   said pictorial representation of said particular motorist emergency distress condition is prominently displayed on each opposing face of each said sign;
   each said emergency display sign is fabricated of a sheet of reflective, flexible, rollable cloth-like material;
   each said emergency display sign including an elongated rigid arm member for supporting said signs so as to depend therefrom;
   said arm member being provided with a groove for selectively engaging the upper edge of a vertically adjustable window of said motor vehicle to permit said arm member having said display sign depending therefrom to extend substantially horizontally outwardly from said window when said adjustable window is adjusted to a substantially closed position so that said arm member is securely held in said substantially horizontal position between said upper edge of said window and said upper frame portion for said window;
   each said arm member has provided at one end thereof identification means for easily determining the particular pictorial representation displayed on the sign depending from said arm member when said sign is in a rolled-up condition around said arm member; and
   each said rigid arm member has further secured thereto a written distress notice, said distress notice being disposed in a position so as to be easily visible to passing motorists when said rigid arm member is in said substantially horizontal position extending outwardly from said window;
   means for storing said sign during non-distress motorist driving conditions comprising a container.

* * * * *